United States Patent [19]
Park

[11] Patent Number: 5,475,432
[45] Date of Patent: Dec. 12, 1995

[54] HIBRID VIDEO SIGNAL ENCODER HAVING A BLOCK REARRANGEMENT CAPABILITY FOR BETTER COMPRESSIBILITY

[75] Inventor: Hakjae Park, Incheon, Rep. of Korea

[73] Assignee: Daewoo Electronics Co., Ltd., Seoul, Rep. of Korea

[21] Appl. No.: 997,584

[22] Filed: Dec. 28, 1992

[30] Foreign Application Priority Data

Dec. 31, 1991 [KR] Rep. of Korea ............. 91-25871

[51] Int. Cl.[6] ............. H04N 7/30; H04N 7/32
[52] U.S. Cl. ............. 348/409; 348/412; 348/413; 348/416
[58] Field of Search ............. 358/133, 136, 358/105, 135; 348/409, 410, 412, 413, 456, 446, 384, 390, 400, 401, 402, 415, 416; H04N 7/133, 7/137

[56] References Cited

U.S. PATENT DOCUMENTS

| | | | |
|---|---|---|---|
| 4,278,996 | 7/1981 | Netravali et al. | 348/413 |
| 5,021,879 | 6/1991 | Vogel | 348/402 |
| 5,068,724 | 11/1991 | Krause et al. | 358/136 |
| 5,089,888 | 2/1992 | Zdepski et al. | 358/133 |
| 5,091,782 | 2/1992 | Krause et al. | 348/400 |
| 5,150,432 | 9/1992 | Ueno et al. | 358/136 |
| 5,159,448 | 10/1992 | Kojima | 348/409 |
| 5,175,618 | 12/1992 | Ueda et al. | 358/136 |
| 5,196,932 | 3/1993 | Hoshi | 348/409 |

FOREIGN PATENT DOCUMENTS 0490799  6/1992  European Pat. Off. .

OTHER PUBLICATIONS

"Image Processing Algorithms and Techniques", Keith S. Pennington and Robert Moorehead II, SPIE, Sep. 11, 1990.

Primary Examiner—Tommy P. Chin
Assistant Examiner—Vu Le
Attorney, Agent, or Firm—Baker & Daniels

[57] ABSTRACT

A hybrid coder, for performing interframe video encoding which combines the advantages of both the interfield and the interframe codings for low bit-rate video transmission; the pel elements of a differential block from a subtracter is rearranged; the complexity of a present input block and the horizontal motion vector thereof are estimated; and, then, one of the differential block and the rearranged block is subjected to a two-dimensional transform according to the complexity and the horizontal motion vector.

4 Claims, 3 Drawing Sheets

FIG.3A

|   | 1 | 2 | 3 | · | · | · | · | · | · | · | 14 | 15 | 16 |
|---|---|---|---|---|---|---|---|---|---|---|----|----|----|
| 1 | 0 | 0 | 0 | · | · | · | · | · | · | · | 0  | 0  | 0  |
| 2 | X | X | X | · | · | · | · | · | · | · | X  | X  | X  |
| 3 | 0 | 0 | 0 | · | · | · | · | · | · | · | 0  | 0  | 0  |
| 4 | X | X | X | · | · | · | · | · | · | · | X  | X  | X  |
| · | · | · | · | · | · | · | · | · | · | · | ·  | ·  | ·  |
| · | · | · | · | · | · | · | · | · | · | · | ·  | ·  | ·  |
| · | · | · | · | · | · | · | · | · | · | · | ·  | ·  | ·  |
| · | · | · | · | · | · | · | · | · | · | · | ·  | ·  | ·  |
| · | · | · | · | · | · | · | · | · | · | · | ·  | ·  | ·  |
| · | · | · | · | · | · | · | · | · | · | · | ·  | ·  | ·  |
| 16| X | X | X | · | · | · | · | · | · | · | X  | X  | X  |

FIG.3B

|    | 1 | 2 | 3 | · | · | · | · | · | · | · | 14 | 15 | 16 |
|----|---|---|---|---|---|---|---|---|---|---|----|----|----|
| 1  | 0 | 0 | 0 | · | · | · | · | · | · | · | 0  | 0  | 0  |
| 2  | 0 | 0 | 0 | · | · | · | · | · | · | · | 0  | 0  | 0  |
| ·  | · | · | · | · | · | · | · | · | · | · | ·  | ·  | ·  |
| ·  | · | · | · | · | · | · | · | · | · | · | ·  | ·  | ·  |
| ·  | · | · | · | · | · | · | · | · | · | · | ·  | ·  | ·  |
| 8  | 0 | 0 | 0 | · | · | · | · | · | · | · | 0  | 0  | 0  |
| 9  | X | X | X | · | · | · | · | · | · | · | X  | X  | X  |
| 10 | X | X | X | · | · | · | · | · | · | · | X  | X  | X  |
| ·  | · | · | · | · | · | · | · | · | · | · | ·  | ·  | ·  |
| ·  | · | · | · | · | · | · | · | · | · | · | ·  | ·  | ·  |
| ·  | · | · | · | · | · | · | · | · | · | · | ·  | ·  | ·  |
| 16 | X | X | X | · | · | · | · | · | · | · | X  | X  | X  |

HIBRID VIDEO SIGNAL ENCODER HAVING A BLOCK REARRANGEMENT CAPABILITY FOR BETTER COMPRESSIBILITY

FIELD OF INVENTION

The present invention relates to an encoding system for the transmission of video information, and, more particularly, to an interframe encoding system which allows rearrangement of a block of pel data from a digitized frame for the low bit-rate transmission of video information.

DESCRIPTION OF THE PRIOR ART

In recent years, with the dramatic growth of the information industry, a greater demand has been created for the accumulation and transmission of video information in addition to text and speech.

Practically speaking, in order to effectively achieve the accumulation and the transmission of the image data, certain compression technique must be employed.

Among the known techniques, hybrid coding, illustrated in FIG. 1, is considered to be the most efficient compression method. (Although FIG. 1 is shown for an interframe coding system, interfield coding systems have essentially similar structures.) With reference to FIG. 1, each block of pel data from digitized frame is fed to a subtracter 1. In the subtracter 1, each block of pel data, each element of which digitally represents the magnitude of a picture element, is compared on an element-to-element basis with the corresponding elements in a restored block from the previous frame. The resultant block of difference data is transformed to a block of transform coefficients using a two-dimensional discrete cosine transformation at a 2-D Discrete Cosine Transformer 2, and the coefficients in each block of transform coefficients are quantized at a quantizer 3 and are encoded at a variable length coder 4 for their transmission through the data channel. At the transmitter, each block and thereby the entire frame is restored by inversely quantizing and transforming the quantized coefficients and adding them to the corresponding restored pel elements of the previous frame at a summer 7. A frame memory 8 stores the restored pel elements for the next block-by-block comparison with the corresponding pel elements in the next video frame.

The encoding efficiency of an interframe encoder has been further improved by using a motion compensation prediction method. In this method, the previous frame is scanned to locate the block that most closely matches the present block within a threshold. Difference data is then formed between the present block and the matching block from the previous frame. In case there is no matching block within the threshold, no signal will be applied to the subtracter 1 from the frame memory 8 and an essentially intraframe coding will be performed. The motion compensation predictor 9 also generates a motion vector indicating the shift of the input block between the present frame and the previous frame. The motion vector, together with the variable length coded block, will be forwarded to a receiver(not shown in FIG. 1).

When the DCT(discrete cosine transformation)is used as a two-dimensional transformation algorithm in a hybrid coder, the coding efficiency depends, among other factors, also on the correlation of a block of pel data. The coding effiency can be increased in parallel with the correlation.

The present coders may employ either an interframe coding or an interfield coding. However, either method has its own drawback which will now be described.

Given a block of pel data in a frame, the correlation of the vertical components in the block is generally higher than that of the vertical components in the corresponding field block. Hence, in case of the interfield coding, where a frame is divided into an even and an odd field and, as such, fed into the coder, the vertical correlation of an input block will be qenerally lower than the corresponding interframe coding. However, even with the interframe coding, the vertical correlation of an input block can be lower than the corresponding interfield coding. This is especially true for a horizontally dynamic and highly complex video input.

SUMMARY OF THE INVENTION

Therefore, an object of the present invention is to combine the advantages of both the interfield coding where there is a horizontally dynamic and highly complex area and the interframe coding where there is no such horizontally dynamic and highly complex area in a hybrid type coder for a low bit-rate video transmission.

Accordingly, the present invention provides an interframe video encoder for encoding an input block of pel data from a video frame comprising: means for generating a differential block of pel elements by differentially combining the pel elements of the input block with the pel elements of a block from a previous frame, which most closely matches the input block; means for qenerating a rearranged block of pel elements by rearranging pel elements of the differential block; means for generating a control signal based on characteristics of the input block; means for transforming a block of pel elements into a block of transform coefficients by using a two-dimensional signal transformation; means for connecting either the differential block or the rearranged block to said transforming means in response to the control signal; means for quantizing the coefficients in the block of transform coefficients; means for reconstructing the differential block in respones to the control signal; and means for encoding the quantized transform coefficients for their transmission in a data stream.

BRIEF DESCRIPTION OF THE DRAWINGS

FIG. 3A describes a block(16×16) of pel data from a frame before their rearrangement by the rearranger in FIG. 2 wherein "O" represents a pel data in an odd field whereas "X" represents a pel data in an even field.

FIG. 3B illustrates a block(16×16) of pel data from the frame after their rearrangement.

DETAILED DESCRIPTION OF THE PREFERRED EMBODIMENT

Figure 1:
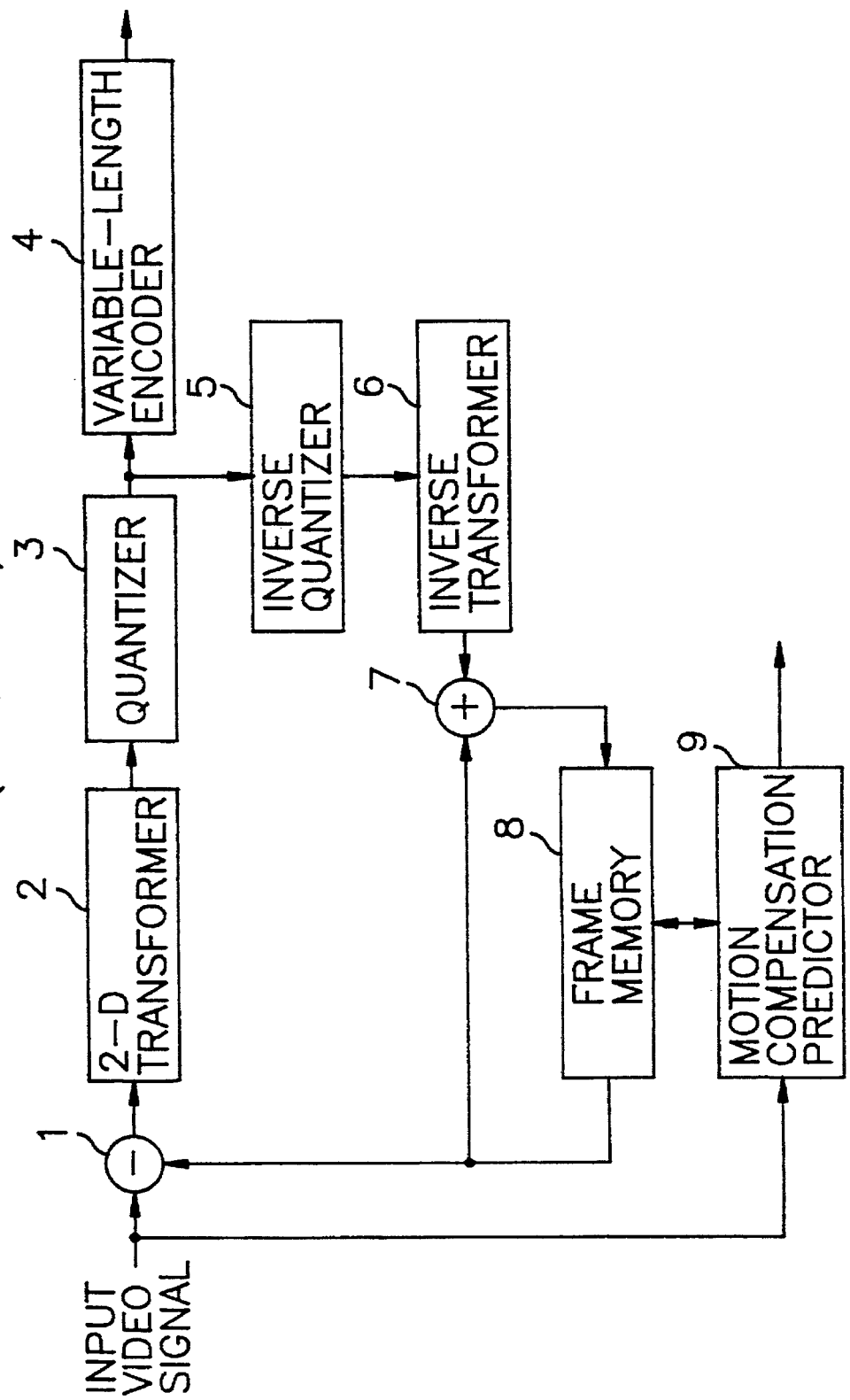
FIG. 1 shows a block diagram of a prior art hybrid coder.
Figure 2:
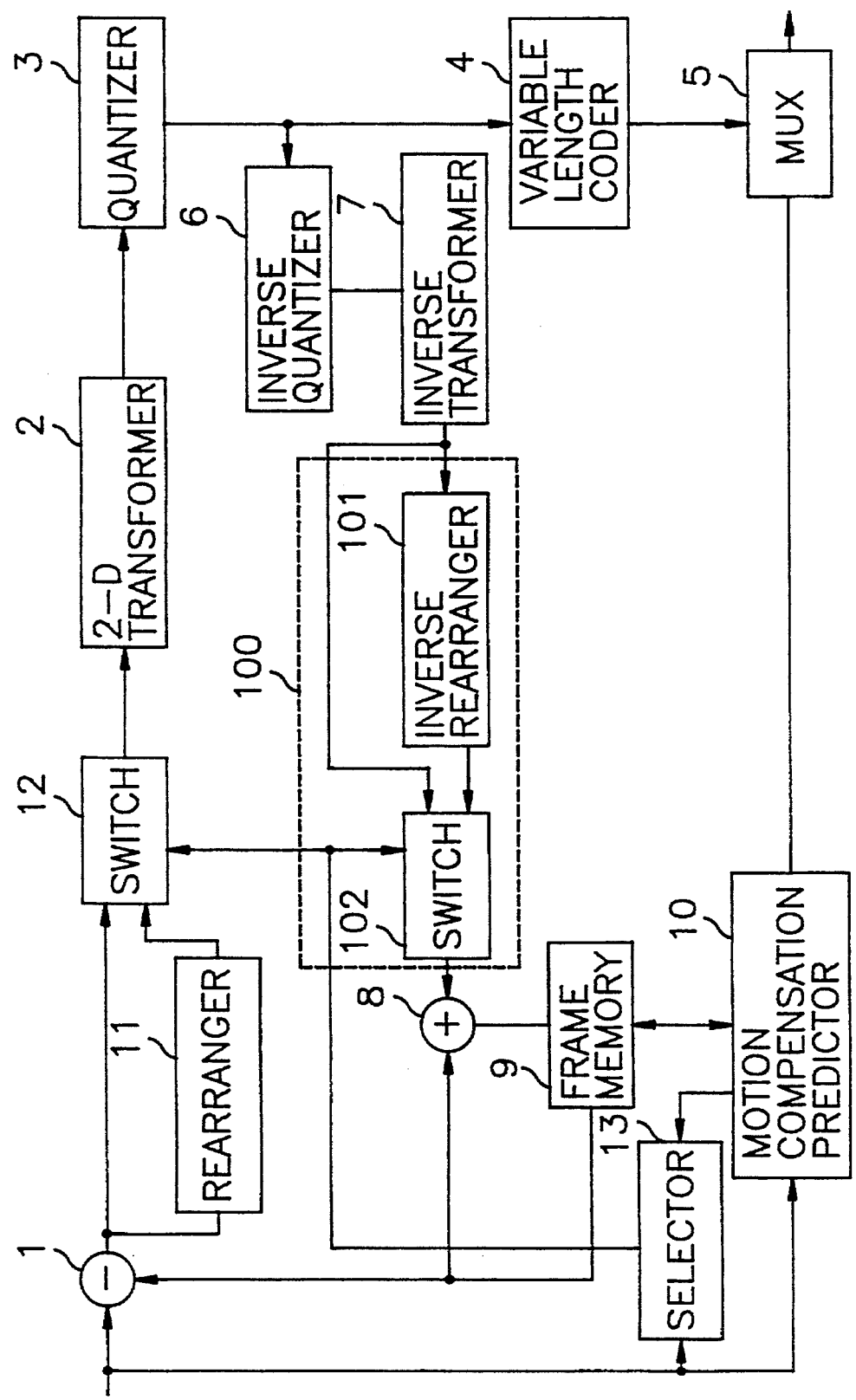
FIG. 2 represents a block diagram of a hybrid coder in accordance with the present invention.

The hybrid coder embodying the present invention, as shown in FIG. 2, comprises: a subtracter 1, a two-dimensional discrete cosine transformer 2, a quantizer 3, a variable-length coder 4, a multiplexer 5, an inverse quantizer 6, an inverse discrete cosine transformer 7, a summer 8, a frame memory 9 and a motion compensation predictor 10, as is conventional hybrid coder, and further comprises a block rearranger 11, a switch 12, a selector 13 and reconstructing means 100.

The m×n (for example, 8×8, 16×16, 32×16, etc.) blocks of pel data from a digitized frame of video input are applied to the subtracter 1, block-by-block. In the mean time, the frame memory 9 has in its storage blocks of pel data from the previous frame. The differential block is then formed between a present block and the most closely matching block from the previous frame.

The stored blocks in the frame memory 9 can be sent to the subtracter 1 and the summer 8 under the control of the motion compensation predictor 10. The frame memory 9 can also store the restored block from the summer 8 under the control of the motion compensation predictor 10.

The motion compensation predictor 10 searches from the frame memory 9 for a block that most closely matches the present block and then commands the memory 9 to provide the matching block to the subtracter 1 and the summer 8(but for the predictor 10 adopted in the present invention for the increased coding efficiency, the matching blocks will be the corresponding block located in the corresponding position in the previous frame). Subsequently, the present block will be restored in the memory 9 replacing the matching block.

In addition, the motion compensation predictor 10 generates a motion vector representing the shift of the input block between the present frame and the previous frame for multiplexer 5 which will be described later. The predictor 9 also provides a horizontal motion vector corresponding to the horizontal component of the motion vector for the selector 13.

The block rearranger 11 rearranges the differential block and provides the rearranged block for the switch 12. The block rearranger 11, in the face of the differential block shown in FIG. 3A wherein "O" stands for the pel data in an odd field and "X" stands for the pel data in an even field, rearranges the block in the manner shown in FIG. 3B. (Although FIGS. 3A and 3B are shown for a 16×16 block, other sizes of block, for example, 8×8, 32×16, etc., can equally be adopted in the present invention.)

The selector 13, then, detects the complexity of the input block by a known method, for example, by obtaining the variance of the input block. Thereafter, the selector 13 generates a control signal for the switch 12 and the reconstructing means 100, depending on the detected complexity and the horizontal motion vector.

The switch 12 then, according to the generated control signal, provides either the differential block from the subtracter 1 or the rearranged block from the rearranger 11 for the two-dimensional discrete cosine transformer 2.

When both the complexity and the horizontal motion vector of the input block are above their respective predetermined values, acknowledging that the input block is highly complex and horizontally dynamic and accordingly, the vertical correlation of the rearranged block is higher than that of the differential block, the switch 12 should provide the rearranged block for the transformer 2. While, when the above condition does not hold, the switch 12 should provide the differential block for the transformer 2. In conclusion, the decision logic of the selector 13 is the function of both the complexity and horizontal vector of the input block, and will be constructed individually through lots of experiments for best results. In consequence, the coding efficiency of the two-dimensional discrete cosine transformer 2 will be improved for the better vertical correlation of its input block provided by the switch 12.

After the two-dimensional discrete cosine transform has been performed by the transformer 2, the transform coefficients of each transformed block are then quantized by the quantizer 3(for example, uniform quantizer) to improve the coding efficiency.

The quantized transform coefficients in each transformed and quantized block are then encoded into variable-length codes such as Huffman codes by the variable length coder 4. In the multiplex 5, the resultant bit stream will be combined with a motion vector from the motion compensation predictor 10 and the combined data wil be sent to the receiver(not shown).

Turning now to the restoring operation of the transmitter, while each block of transformed differential coefficients is transmitted to the receiver, the actual magnitudes of the pel values in the block are restored within the transmitter for differential comparison with the pel elements in the next video frame. Accordingly, an inverse quantizer 6 remaps the quantized transform coefficients to the transform coefficient levels and an inverse transformer 7 transforms these transform coefficients back to the rearranged or differential pel element levels.

The differential pel elements can be added by the summer 8 directly to the pel elements of the previous frame stored in the frame memory 9. However, the rearranged pel elements can not be added directly to the pel elements of the previous frame without distortion. Therefore, when the encoder transmits the rearranged block, the rearranged pel elements must be inversely rearranged to get back original differential pel elements before the summation at the summer 8. Thus, when the switch 12 has provided the differential block for the two-dimensional discrete cosine transformer 2 in response to the control signal from the selector 13, the switch 102 must provide the inversely transformed block for the summer 8 in response to the control signal from the selector 13. Whereas, when the switch 12 has provided the rearranged block for the transformer 2, the switch 102 must provide the inversely rearranged block from inverse rearranger 101 for the transformer 2. In consequence, the switch 102 in the reconstructing means 100 connects one of the two blocks of pel elements to the summer 8 depending on the control signal from the selector 13.

Thereafter, the resultant restored block will be stored in the frame memory 9 for a subsequent differential comparison with the next video frame.

While the present invention has been shown and described with reference to the particular embodiment, it will be apparent to those skilled in the art that many changes and modifications may be made without departing from the spirit and scope of the invention as defined in the claims.

What is claimed is:

1. An interframe video encoder for encoding an input block of pel elements from a video frame comprising:

means for generating a differential block of pel elements by differentially combining the pel elements of the input block with the pel elements of a block from a previous frame, which most closely matches the input block;

means for generating a rearranged block of pel elements by rearranging the pel elements of the differential block;

means for generating a control signal based on a complexity of the input block and a horizontal component of a motion vector of the input block, wherein said complexity is determined by obtaining a variance of the input block and wherein said motion vector represents the shift of the input block between the video frame and the previous frame;

a transformer for transforming either the differential or the rearranged block of pel elements into a block of transform coefficients by using a two-dimensional signal transformation;

means for connecting either the differential block or the rearranged block to said transforming means in response to the control signal;

a quantizer for quantizing the block of transform coefficients into a block of quantized transform coefficients;

means for reconstructing the differential block in response to the control signal;

means for encoding the quantized transform coefficients for their transmission in a data stream;

means for deriving said motion vector from the video frame and the previous frame; and means for combining said motion vector with the data stream.

2. The encoder of claim 1, wherein said means for generating the rearranged block generates the rearranged block by converting the differential block into a pair of vertically adjacent blocks having an odd field and an even field block, said odd field block including odd-numbered horizontal lines of the pel elements of the differential block, and said even field block including even-numbered horizontal lines of the pel elements of the differential block.

3. The encoder of claim 2, wherein said means for generating the control signal generates the control signal having either a first value when said complexity and the horizontal component of said motion vector are above their respective predetermined values, or otherwise a second value, and wherein said connecting means connects either the differential block in response to the second value of the control signal or the rearranged block in response to the first value of the control signal to said transforming means.

4. The encoder of claim 2 or 3, wherein said two-dimensional signal transformation is a two-dimensional discrete consine transformation.

* * * * *

UNITED STATES PATENT AND TRADEMARK OFFICE
CERTIFICATE OF CORRECTION

PATENT NO. : 5,475,432
DATED : December 12, 1995
INVENTOR(S) : Hakjae Park

It is certified that error appears in the above-indentified patent and that said Letters Patent is hereby corrected as shown below:

On the title page, item [54] and Column 1, line 1, should read

-- HYBRID VIDEO SIGNAL ENCODER HAVING A BLOCK REARRANGEMENT CAPABILITY FOR BETTER COMPRESSIBILITY --

Signed and Sealed this

Thirtieth Day of April, 1996

Attest:

BRUCE LEHMAN

Attesting Officer  Commissioner of Patents and Trademarks